United States Patent [19]

Pagel

[11] 3,904,744

[45] Sept. 9, 1975

[54] PROCESS FOR THE PRODUCTION OF HYDROGEN-CONTAINING GASES

[75] Inventor: John F. Pagel, Rockaway, N.J.

[73] Assignee: Exxon Research & Engineering Co., Linden, N.J.

[22] Filed: Oct. 1, 1973

[21] Appl. No.: 402,301

[52] U.S. Cl. ............... 423/652; 48/197 R; 48/214; 252/373
[51] Int. Cl. ............................................. C01b 1/18
[58] Field of Search .......... 423/651, 652, 653, 654; 48/197 R, 214; 252/373

[56] References Cited

UNITED STATES PATENTS

| | | | |
|---|---|---|---|
| 3,297,408 | 1/1967 | Marshall | 423/652 |
| 3,395,104 | 7/1968 | Taylor et al. | 423/651 |
| 3,420,642 | 1/1969 | Percival | 48/214 |
| 3,441,395 | 4/1969 | Dent | 48/214 |
| 3,450,514 | 6/1969 | Sinfelt et al. | 48/197 R |
| 3,479,298 | 11/1969 | Sze et al. | 423/651 |
| 3,551,124 | 12/1970 | Iwaki et al. | 48/197 |
| 3,645,701 | 2/1972 | Banchik et al. | 423/651 |
| 3,743,488 | 7/1973 | Bogart | 48/214 |
| 3,744,981 | 7/1973 | Ward | 48/214 |

FOREIGN PATENTS OR APPLICATIONS

| | | | |
|---|---|---|---|
| 594,285 | 1960 | Canada | 423/652 |
| 1,104,971 | 1965 | United Kingdom | 423/652 |
| 1,138,257 | 1967 | United Kingdom | 423/652 |

*Primary Examiner*—Oscar R. Vertiz
*Assistant Examiner*—Eugene T. Wheelock
*Attorney, Agent, or Firm*—Martle L. Gibbons

[57] ABSTRACT

A hydrogen-rich gas is produced in an integrated two-stage catalytic steam reforming process in which naphtha is utilized as first stage feedstock. The naphtha feedstock is preheated by direct injection of steam generated in the second stage reforming furnace.

11 Claims, 1 Drawing Figure

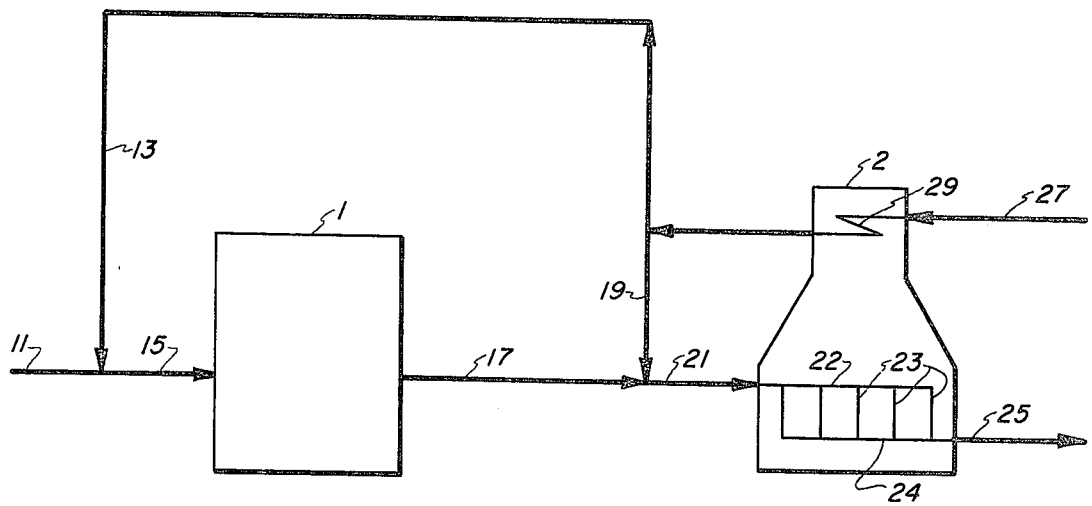

PROCESS FOR THE PRODUCTION OF HYDROGEN-CONTAINING GASES

BACKGROUND OF THE INVENTION

1. Field of the Invention

The invention relates to a process for producing hydrogen. More particularly, the invention relates to an integrated two-stage catalytic steam reforming process utilizing light normally liquid hydrocarbons, such as naphtha, as starting materials.

2. Description of the Prior Art

It is known that hydrogen can be produced by reacting normally liquid hydrocarbons with steam in the presence of a catalyst to produce a methane-rich gaseous mixture and thereafter reacting at least a portion of the methane-rich gaseous mixture with additional steam to produce a hydrogen-rich gaseous mixture (see, for example, U.S. Pat. Nos. 3,481,722; 3,467,506 and *Hydrocarbon Processing*, Apr. 1972, page 94.)

It is also known to produce fuel gases; such as, town gas by a two-stage reforming process in which naphtha can be utilized as feed to the first-stage reformer (see, for example, British Pat. Nos. 1,198,991 and 820,257).

Furthermore, various processes are known for the catalytic steam reforming of hydrocarbon feedstocks, including naphtha, to a methane-rich gaseous mixture (see, for example, *Hydrocarbon Processing, Apr.* 1973, pages 118–120). As disclosed in British Pat. No. 820,257, it is desirable to preheat the mixture of steam and vaporized hydrocarbon prior to introducing the mixture into the steam reformer in which the methane-rich gas is produced. The preheating operation may be carried out by passing the mixture of steam and vaporized hydrocarbon through a fired heater as shown in *Hydrocarbon Processing*, April 1973, page 118, or by mixing superheated steam with the hydrocarbon feed as shown in *Hydrocarbon Processing, April* 1973, page 119.

It has now been found that heat transfer economies and improved results can be obtained in a two-stage catalytic steam reforming process to produce hydrogen by conducting the process under specified conditions. The advantages of the process over prior art processes will become apparent in the ensuing description.

SUMMARY OF THE INVENTION

In accordance with the invention there is provided a process for producing hydrogen, which comprises: preheating a vaporized hydrocarbon feedstock having a final boiling point at atmospheric pressure of not more than about 420°F. by mixing the same with superheated steam; contacting the resulting preheated admixture in a first catalytic reforming zone with steam and a reforming catalyst under conditions to produce a gas containing at least about 10 mole percent methane (on a dry basis) together with hydrogen, carbon oxides and undecomposed steam; contacting at least a portion of the total first reforming stage effluent with additional steam and a second steam reforming catalyst in a second reforming stage positioned in the radiant section of a tubular steam reforming furnace under conditions to produce a hydrogen-rich gas; converting water to superheated steam in the convection section of said reforming furnace; passing at least a portion of the resulting superheated steam to the preheating step, and recovering a hydrogen-rich gas from the second reforming stage.

BRIEF DESCRIPTION OF THE DRAWING

The FIGURE is a diagrammatic flow plan of one embodiment of the invention.

DESCRIPTION OF THE PREFERRED EMBODIMENT

The preferred embodiment will be described with reference to the FIGURE.

Referring to the FIGURE, a vaporized hydrocarbon feed is introduced into line 11 where it will mix with superheated steam injected into the feed via line 13 to form a preheated mixture of vaporized hydrocarbon and steam in line 15. The steam is introduced into the feed in amounts sufficient to give a steam to carbon atom in the feed ratio varying between about 1.5 and 4, preferably between 2 and 3, for example, a ratio of about 2.25. Suitable hydrocarbon feed include light hydrocarbons having a final boiling point of not more than about 420°F., preferably having a final boiling point of not more than about 365°F. at atmospheric pressure. The vaporized hydrocarbon feed may have been subjected to a prior desulfurization treatment since many of the conventional steam reforming catalysts are poisoned by sulfur compounds. Alternatively, the desulfurization can be conducted in the first reforming stage by introducing therein additional hydrogen and a catalyst having hydrodesulfurization activity.

The preheated admixture of steam and vaporized hydrocarbon is introduced into a first catalytic reforming stage 1 maintained at a temperature in the range of about 700° to 1000°F., preferably in the range of about 800° to 900°F., for example at about 850°F., and at a pressure in the range of about 250 to 550 pounds per square inch gauge (psig). The space velocity at which the reactants are introduced into the first reforming zone can vary widely and will depend upon the particular catalyst used and the actual operating conditions. A bed of a conventional catalyst suitable for steam reforming naphtha at low temperatures is present in the first reforming stage. Under the above given operating conditions, the hydrocarbon feed and steam react in the presence of the catalyst to form a methane-rich gaseous mixture including hydrogen, carbon oxides and undecomposed steam. By the expression "methane-rich gas" is intended a gaseous mixture containing at least 10 mole percent of methane (on a dry basis). Desirably, the first reforming stage is operated such as to maximize methane production. The low temperature steam reforming catalyst can be any of the known steam reforming catalysts suitable for converting light normally liquid hydrocarbons to a methane-rich gas. Suitable catalysts include a nickel on alumina catalyst which may further contain a promoter such as an alkali metal or alkaline earth compound such as the catalysts described in British Pat. Nos. 969,637 and 1,150,066. Such a catalyst may be prepared by treating an aqueous solution of water soluble salts, for example, the nitrates of nickel and aluminum with an alkali such as sodium carbonate to produce a precipitate of a mixture of nickel and aluminum compounds washing and drying the precipitate, reducing the nickel compound to metallic nickel and granulating or pelleting the resulting mixture of nickel and alumina.

The methane-rich gas mixture is removed from the first reforming stage via line 17.

Superheated steam is introduced into the methane-rich gaseous effluent of the first reforming stage via line 19 and the resulting mixture is introduced via line 21 into inlet header 22 of a tubular steam reforming furnace 2. The steam reforming furnace is a conventional commercial furnace which contains a series of vertically disposed alloy tubes 23 within a furnace box and connected to inlet header 22 and outlet header 24. In the lower or radiant section of the furnace, heat is transferred to the furnace tubes by radiation from the flame and high temperature flue gas. In the upper or convection section of the furnace, a band of tubes receives heat from the hot flue gases mainly by convection. The mixture of steam and methane-rich gas passes from inlet header 22 through the series of parallel tubes 23 which are present in the radiant section of the furnace. At least a portion of each of the tube is packed with a conventional steam reforming catalyst. The tubes form a parallel multitubular reaction zone which is the second steam reforming stage of the present process.

Desirably, the ratio of steam to carbon atom in the methane-rich gas introduced into the second reforming stage is from about 3 to about 10, preferably from about 4 to about 7, more preferably about 6. The admixture of steam and methane-rich gas is introduced into the second steam reforming zone at a space velocity ranging broadly from about 4 to 8000 volumes of admixture per hour per volume of catalyst present therein, preferably at a space velocity ranging from about 5 to 7000 volumes of admixture per hour per volume of catalyst, more preferably at a space velocity of about 6000 volumes of admixture per hour per volume of catalyst.

The second reforming stage is operated at an inlet temperature ranging from about 700° to 1200°F., preferably in the range of about 900° to 1000°F., for example, at an inlet temperature of about 950°F. and at an outlet temperature ranging from about 1300° to 1650°F., preferably in the range of about 1400° to 1550° F., for example, at an outlet temperature of about 1500°F. By inlet temperature is meant the temperature of the reactants at the inlet of the catalyst-containing tubes as measured in the inlet header. By outlet temperature is meant the temperature of the gaseous effluent of the catalyst-containing tubes as measured in the outlet header. The pressure at the inlet and outlet of the second reforming stage can vary widely. Suitable pressures include an outlet pressure in the range of about 200 to 500 psig.

The catalyst in the second reforming zone may be any conventional gas feed type of steam reforming catalyst suitable for promoting the reaction of methane and steam to produce hydrogen. Typical suitable reforming catalysts include nickel catalysts such as nickel and/or nickel oxide supported on a carrier such as alumina. The nickel catalyst generally contains 8 to 30 weight percent nickel calculated as NiO and may additionally contain other metal or metal compound promoters, such as, for example, the catalysts described in British Pat. No. 1,039,206 and Belgian Pat. No. 699,949.

Under the above given operating conditions, the steam and methane-rich gas react to form a hydrogen-rich gaseous mixture which also comprises carbon oxides. By hydrogen-rich gaseous mixture is intended a gaseous mixture containing at least 50 mole % hydrogen (on a dry basis).

The second reforming stage effluent is removed from the reaction zone via line 25 and, if desired, further treated in conventional ways to produce high purity hydrogen, that is a purity of greater than 90% by volume, if desired, a purity of 95 to 98% by volume.

In the convection section of the furnace, water is introduced via line 27 into a tube 29 present therein to utilize the heat present in the convection section to form the superheated steam which is needed for preheating the feed of the first reforming zone and to preheat the feed of the second reforming zone. The need for a fired heater to preheat the feed of the first reforming zone is eliminated by the integrated heat transfer scheme of the present invention thereby effecting economies in capital outlay and in heat requirement.

ILLUSTRATIVE EXAMPLE

A vaporized straight run naphtha cut of $C_5$ to 310°F. which has been desulfurized to contain not more than 2 weight parts per million sulfur at a temperature of 650°F. is blended with superheated 975°F. steam (produced in the convection section of a tubular reformer) to form a 858°F. mixture of reactants at a steam to carbon atom in the feed ratio of 2.25. The mixture is introduced into a first reforming stage to contact a steam reforming catalyst comprising at least about 60 weight percent nickel on alumina.

Reaction of the steam with the hydrocarbon feed in the first reforming stage produces a methane-rich gaseous effluent which is mixed with additional 975°F. superheated steam in amounts sufficient to give a ratio of steam to carbon atom in the feed to the second reforming stage of about 6. The admixture at 956°F. is introduced into the second reforming stage located in a tubular steam reforming furnace. The catalyst in the second reforming stage (tubes) is a conventional steam reforming catalyst which comprises 11 weight percent nickel, 7 weight percent uranium, less than 2 weight percent barium on an alpha alumina support.

The operating conditions in the first and second reforming zones for the above given specific illustrative example are summarized in Table I.

TABLE I

| OPERATING CONDITIONS | |
|---|---|
| First Reforming Stage | |
| Inlet Temperature, °F. | 858 |
| Outlet Temperature, °F. | 937 |
| Outlet Pressure, psig | 365 |
| Ratio steam to carbon atom in feed | 2.25 |
| Reactants, Space Velocity, lbs. hydrocarbon/hr./ft³ of catalyst | 2000.0 |
| Second Reforming Stage | |
| Inlet Temperature, °F. | 956 |
| Inlet pressure, psig | 355 |
| Outlet Temperature, °F. | 1450 |
| Outlet pressure, psig | 315 |
| Ratio steam to carbon atom in second stage feed | 6 |
| Reactants, Space Velocity, vol./hr./vol. | 6000 |

Table II indicates the products obtainable from the process when operating in accordance with the specific conditions given in Table I.

TABLE II

| Constituents | Mole % First Stage Effluent | Mole % Second Stage Effluent |
|---|---|---|
| $CH_4$ | 24.4 | 1.4 |
| $H_2$ | 9.1 | 30.5 |
| CO | 0.3 | 3.6 |
| $CO_2$ | 8.8 | 7.5 |
| $H_2O$ | 57.4 | 57.0 |

What is claimed is:

1. A process for producing hydrogen, which comprises:
   a. preheating a vaporized normally liquid hydrocarbon feedstock having a final boiling point at atmospheric pressure of not more than about 420°F. by mixing the same with superheated steam;
   b. contacting the resulting preheated admixture in a first catalytic reforming zone with steam and a reforming catalyst under conditions to produce an effluent gas containing at least about 10 mole % methane (on a dry basis) together with hydrogen and carbon oxides;
   c. contacting at least a portion of the first reforming stage effluent gas with additional steam and a second steam reforming catalyst in a second reforming stage positioned in the radiant section of a tubular steam reforming furnace under conditions to produce a hydrogen-rich gas;
   d. converting water to superheated steam in the convection section of said reforming furnace;
   e. passing at least a portion of the resulting superheated steam to step (a), and
   f. recovering said hydrogen-rich gas from said second reforming stage.

2. The process of claim 1 wherein the first reforming stage is maintained at a temperature in the range of about 700° to 1000° F., and a pressure in the range of about 250 to 550 psig.

3. The process of claim 1 wherein the ratio of steam to carbon atom in the feed introduced into said first reforming stage ranges from about 1.5 to 4.

4. The process of claim 1, wherein said second reforming stage conditions include an inlet temperature in the range of about 700° to 1200°F. and an outlet temperature in the range of about 1300° to 1650°F.

5. The process of claim 4, wherein the outlet pressure of said second reforming stage is in the range of about 200 to 500 psig.

6. The process of claim 1, wherein said second reforming stage conditions include an inlet temperature in the range of about 900° to 1000°F. and an outlet temperature of about 1400° to 1550°F.

7. The process of claim 1 wherein a mixture of said additional steam and said portion of first reforming stage effluent is introduced into said second reforming stage at a space velocity of 6000 volumes of mixture per hour per volume of catalyst.

8. The process of claim 1 wherein the ratio of steam to carbon atom of the first reforming stage effluent introduced into said second reforming stage is from about 3 to about 10.

9. The process of claim 1 wherein said hydrocarbon feed to the first reforming stage is a naphtha fraction having a final boiling point of not more than about 365°F.

10. The process of claim 1 wherein said hydrocarbon feed has been at least partially desulfurized prior to said preheating step.

11. A process for producing hydrogen, which comprises:
   a. preheating a vaporized normally liquid hydrocarbon feedstock having a final boiling point at atmospheric pressure of not more than about 420°F. by mixing the same with superheated steam;
   b. contacting the resulting preheated admixture in a first catalytic reforming zone with steam and a reforming catalyst at a temperature in the range of about 700° to 1000°F. and a pressure in the range of about 250 to 550 psig to produce an effluent gas containing at least about 10 mole percent methane (on a dry basis) together with hydrogen and carbon oxides;
   c. contacting at least a portion of the first reforming stage effluent gas with additional steam and a second steam reforming catalyst in a second reforming stage positioned in the radiant section of a tubular steam reforming furnace, said second reforming stage having an inlet temperature in the range of about 700° to 1200°F., an outlet temperature in the range of about 1300° to 1650°, and an outlet pressure in the range of about 200 to 500° psig, to produce a hydrogen-rich gas;
   d. converting water to superheated steam in the convection section of said reforming furnace;
   e. passing at least a portion of the resulting superheated steam to step (a), and
   f. recovering said hydrogen-rich gas from said second reforming stage.

* * * * *